(12) United States Patent
Wen et al.

(10) Patent No.: US 8,617,304 B2
(45) Date of Patent: Dec. 31, 2013

(54) BIO-BASED COATING

(76) Inventors: Ben Wen, Horseheads, NY (US); Jessica Peng Zhang, Horseheads, NY (US)

(*) Notice: Subject to any disclaimer, the term of this patent is extended or adjusted under 35 U.S.C. 154(b) by 983 days.

(21) Appl. No.: 12/711,085

(22) Filed: Feb. 23, 2010

(65) Prior Publication Data

US 2011/0206836 A1    Aug. 25, 2011

(51) Int. Cl.
*C09D 5/26* (2006.01)
*C09D 191/00* (2006.01)
*C09D 7/12* (2006.01)

(52) U.S. Cl.
CPC ............... *C09D 5/26* (2013.01); *C09D 7/1216* (2013.01); *C09D 7/1266* (2013.01); *C09D 191/005* (2013.01)
USPC ........................... 106/244; 106/264; 106/310

(58) Field of Classification Search
USPC .......................................... 106/244, 264, 310
See application file for complete search history.

(56) References Cited

U.S. PATENT DOCUMENTS

| | | | |
|---|---|---|---|
| 1,611,784 A | | 12/1926 | Schmitte |
| 2,673,814 A | | 3/1954 | MacLaren |
| 2,807,553 A | * | 9/1957 | Fischer .......... 106/243 |
| 3,298,848 A | * | 1/1967 | Wachholtz et al. ........... 106/264 |
| RE27,433 E | * | 7/1972 | Fischer .......... 106/310 |
| 4,055,453 A | | 10/1977 | Tajima |
| 4,877,675 A | | 10/1989 | Falicoff et al. |
| 5,674,559 A | | 10/1997 | Riemer et al. |
| 5,977,201 A | | 11/1999 | Jahns et al. |
| 6,294,258 B1 | | 9/2001 | Gentile |
| 6,440,592 B1 | * | 8/2002 | Meyer et al. .............. 428/701 |
| 6,495,074 B1 | | 12/2002 | Carr |
| 2007/0087166 A1 | | 4/2007 | Lee et al. |
| 2008/0038454 A1 | | 2/2008 | Keller et al. |

FOREIGN PATENT DOCUMENTS

| | | |
|---|---|---|
| FR | 787345 A | 9/1935 |
| WO | WO0174948 A1 | 10/2001 |
| WO | WO2008117077 A2 | 2/2008 |

OTHER PUBLICATIONS

Chaohua Wang and Sevim Erhan, "Studies of Thermal Polymerization of Vegetable Oils with a Differential Scanning Calorimeter," AOCS Press, JAOCS, vol. 76, No. 10 (1999), Oil Chemical Research, ARS, USDA, NCAUR, Peoria, Illinois 61604.
Irene Gattinger, International Search Report on PCT/US2011/022813, European Patent Office. P.B. 5818 Patenllaan 2, NL—2280 HV Rijswijk, mailed May 24, 2011.

* cited by examiner

*Primary Examiner* — David M Brunsman
(74) *Attorney, Agent, or Firm* — Louis Ventre, Jr.

(57) ABSTRACT

A bio-based coating for a building automatically transmits or reflects heat gain from infrared sunlight. The coating is composed of bio-based polymerized oil and a catalyst that is also a thermochromic material. The catalyst reduces the temperature for polymerization of the oil to create a suspension that forms a hardened mixture when cooled below about 100 degrees Centigrade. The thermochromic properties of the catalyst are operable to switch the hardened mixture from transparent to reflective of infrared light when the temperature rises above a switching temperature in an approximate range of 18 degrees Centigrade to 35 degrees Centigrade. The method of using the coating involves spraying a hot bio-based coating on the roof surface and allowing it to cool. The method of making involves heating the suspension to a reaction temperature, holding at the reaction temperature, and, introducing an air flow through the mixture at the reaction temperature.

9 Claims, 2 Drawing Sheets

A method of using the bio-based coating on a building roof surface to permit transmission of infrared light when the temperature is below a switching temperature between about 18 and 35 degrees Centigrade and reflect infrared light when the temperature is above that switching temperature — 200 spraying the suspension on the roof surface to form a membrane covering over the roof surface — 210 allowing the membrane covering to cool and harden — 220

FIG.2

BIO-BASED COATING

TECHNICAL FIELD

In the field of stock material for a coating in which at least one constituent is disposed to respond to a temperature stimulus in a predetermined manner to produce a transparent or reflective result.

BACKGROUND ART

Roof coatings are well known in the art. Roof coatings that involve temperature management typically involve reflection of sunlight to maintain a cool building. To reduce interior temperature and energy use, cool roofs have been used on commercial, industrial, and residential buildings. Cool roofs are made of highly reflective and emissive materials to help roofs absorb less heat. In 2006, cool roof products represented more than 25% of the manufacturers' shipments in the commercial roofing sector and 10% percent in the residential.

The present invention expands the capability of coatings to automatically and autonomously allow heating by transmission of sunlight, and aid in cooling by reflecting sunlight.

The present invention is unique in that it also is made with renewable bio-based oils. While unused oil may be used, the invention takes on greater environmental value by offering an energy conservation use for waste oil.

The bio-based thermochromic coating of the present invention provides a hardened coating that can autonomously respond to outside temperature changes to transmit or reflect infrared sunlight and thus help heat or cool a building as dictated by actual environmental conditions. The focus of the present invention is infrared radiation and this is distinct from prior art that usually focuses on the transmission or reflection of visible light through windows. For example, the use of a thermochromic coating for windows is taught in U.S. Pat. No. 6,440,592, which also instructs on the use of an intermediate layer comprising titanium oxide.

While use of thermochromic materials in coatings is known, the present invention is unique in the mixture of oil and a catalyst that comprises a thermochromic material. The prior art does not describe this coating composition with catalysis serving to lower the polymerization of triglycerides with monounsaturated and polyunsaturated fatty acid chains in the oil while also having a thermochromic property. The combination is unique.

Waste cooking oil is of particular interest in this invention. Waste cooking oil is both a renewable resource and a recycled product. Presently there are approximately 500 million gallons of waste cooking oils generated annually in the United States.

Waste cooking oils are primarily composed of triglycerides with monounsaturated and polyunsaturated fatty acid chains. These unsaturated chains can be thermally polymerized (branched or cross-linked) through intramolecular and intermolecular linkages via oxygen uptake and the Diels-Alder reaction. Heat is needed to accelerate the reaction.

The degree of cross-linking determines the properties of the polymerized oils. Isomerization and the formation of the intra- and intermolecular bonds involved in the thermal process enable designing a product with the appropriate characteristics. The addition of catalyst activates the thermal polymerization of waste cooking oils at lower temperature.

SUMMARY OF INVENTION

A bio-based roofing or building coating having two principal components in a mixture: bio-based polymerized oil and a catalyst that is also a thermochromic material. The oil has triglycerides with unsaturated fatty acid chains, but no petroleum-based oil. Common oils include vegetable oil, liquid animal fat, algae oil, fish oil, palm oil, and, Jatropha Curcas oil. The catalyst, preferably vanadium oxide with tungsten dopant represented by the formula $V_xW_{1-x}O_2$ in a preferable concentration in a range of about 0.05 to 5 weight percent, reduces the temperature for polymerization of the oil, preferably to about 160 degrees Centigrade, to create a suspension that forms a hardened mixture when cooled below about 100 degrees Centigrade. The x in the formula is a decimal value between zero and 1, preferably in a range of 0.97 to 0.99. The thermochromic properties of the catalyst are operable to switch the hardened mixture from transparent to reflective of infrared light when the temperature rises above a switching temperature in an approximate range of 18 degrees Centigrade to 35 degrees Centigrade.

A preferred method of using the coating on a building roof surface comprises two steps: (1) spraying the bio-based coating on the roof surface to form a membrane covering over the roof surface; and, (2) allowing the membrane cover to cool and harden.

A preferred method of making the bio-based coating comprises the steps of: heating the suspension to a reaction temperature between about 130 to 230 degrees Centigrade; holding at the reaction temperature for a period of time between about 10 to 120 minutes; and, introducing an air flow through the mixture at the reaction temperature at a rate of about 10 to 200 milliliters per minute per gram of oil.

Technical Problem

Cool roofs have a winter time heating penalty because they reflect solar heat that would help warm the building, thereby increasing the heating loads. An annual average heating penalty of up to 17 kilowatt-hours per square meter can significantly offset the average cooling load reduction of up to 48 kilowatt-hours per square meter.

Solution to Problem

To maximize the energy saving by reducing both heating and cooling loads, an intelligent roof coating that can tune the reflectance and transmittance of infrared light based on the environmental temperature shall be developed.

Advantageous Effects of Invention

The intelligent coating of the present invention has the following advantages, it: autonomously responds to the temperature change by adjusting the light transmission; offers a pre-set thermochromic switching temperature that can be varied by composition of the catalyst; is an environmentally friendly, highly bio-based agriculture product; provides a means to achieve improvements to building energy efficiency; is easily made and applied; is resistant to alkyds and acids; has a low odor; is waterproof; and, strongly adheres to a roof surface.

This invention has advantages in providing a new use for waste cooking oils and other bio-based oils to form a hard and durable membrane on a roof or other building wall after it is spray coated on its surface. The oil is preferably catalyzed by a vanadium-oxide-based catalyst $-V_xW_{1-x}O_2$ to polymerize and form a blue-green liquid at a temperature in a range of about 130-230 degrees Centigrade. Preferably, a vanadium-oxide-based nanopowder is used in the mixture so that when the coating hardens, the membrane acts as a thermochromic material to reflect or transmit infrared light based on the environment and membrane temperature, thereby tuning the roof temperature.

At temperatures below the thermochromic switching temperature (for example 26 degrees Centigrade), the membrane is transparent to infrared light and enables solar gain through a roof. Above the transition temperature, the membrane is reflective to infrared light, resulting in a reduction in solar gain on the roof or through the walls. The bio-based thermochromic membrane makes an intelligent roof coating to reduce both cooling and heating loads as it responds to the external environment. In addition to roof applications, this coating can be used on building walls, windows, and other surfaces where control of infrared sunlight transmission or reflectance is desired to control temperature.

BRIEF DESCRIPTION OF DRAWINGS

The drawings show preferred embodiments of the invention comprising a coating, a method of using the coating and a method of making the coating. The reference numbers in the drawings are three digits with the first digit being the figure number.

FIG. 1 is a side view of the coating.
FIG. 2 is a diagram of the method of using the coating.

DESCRIPTION OF EMBODIMENTS

Figure 3:
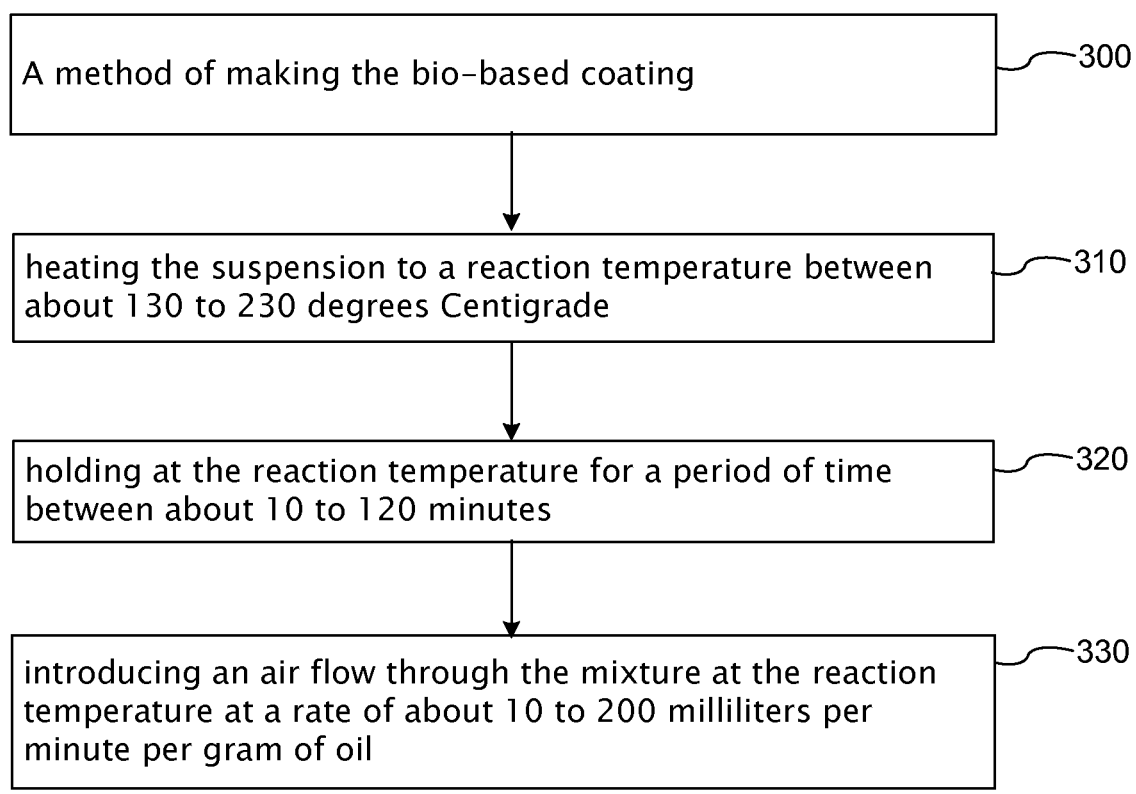
FIG. 3 is a diagram of the method of making the coating.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

FIG. 1 shows a preferred embodiment of the bio-based coating (100) of the invention. It is a bio-based coating (100) that is principally used as a roofing or building coating.

The bio-based coating (100) is a mixture that is preferably 95-99.5% polymerized oil (110) by weight and the remainder is a catalyst (120) that is also a thermochromic material. The catalyst is mixed with the oil before the oil is polymerized. The oil and catalyst are preferably uniformly mixed so that once the oil is polymerized and the coating hardens, little or no infrared light will pass through without contacting the catalyst.

The catalyst (120) is preferably vanadium oxide with tungsten dopant represented by the formula $V_xW_{1-x}O_2$ in a preferable concentration in the mixture in a range of about 0.05 to 5 weight percent. Other concentrations for both the oil and the catalyst may be used. The x in the formula is a decimal value between zero and 1, preferably in a range of 0.97 to 0.99.

The exact concentration of the catalyst for any particular oil may be optimized for catalyzing the polymerization of the oil and for the reflecting or transmitting the infrared heat.

The coating is bio-based because the polymerized oil (110) is not petroleum, or fossil-fuel oil, but rather consists of polymerized oil (110) that is biologically derived. The oil used to make the coating contains triglycerides with unsaturated fatty acid chains.

The oil is preferably waste cooking oil because the invention provides a means to make use of a waste product, and enables energy and resource conservation using this renewable commodity. Common oils include vegetable oil, liquid animal fat, algae oil, fish oil, palm oil, and, Jatropha Curcas oil. The oil may be a mixture of these oils as would be expected when using waste oils.

The catalyst (120) may be any thermochromic material that both reduces the temperature for polymerization of the oil and switches the hardened mixture, that is, the bio-based coating (100), from transparent to reflective of infrared light when the temperature of the bio-based coating (100) rises above a switching temperature in an approximate range of 18 degrees Centigrade to 35 degrees Centigrade. The catalyst (120) is preferably in the form of nanoparticles, which is referred to as nanopowder.

The catalyst (120) will preferably reduce the temperature for polymerization of the oil to a range of about 130-230 degrees Centigrade. However, any reduction below un-catalyzed polymerization temperature of the oil used will satisfy the invention. Generally, metallic catalysts have been used to reduce the polymerization temperature to lower than 230 degrees Centigrade. This compares to a polymerization temperature of about 230 to over 300 degrees Centigrade in the absence of a catalyst. In the polymerization process, the oils will either be stirred during the reaction or bubbled with air. Alternatively, the coating mixture may be made in a rotary drum or other containers. Hot air can be used to provide oxygen and heat for the reaction. The polymerization process is explained in "Studies of Thermal Polymerization of Vegetable Oils with a Differential Scanning calorimeter," by Chaohua Wang and Sevim Erhan, JAOCS, Vol. 76, no. 10 (1999) in Oil Chemical Research, ARS, USDA, NCAUR, Peoria, Ill. 61604, which is hereby incorporated by reference herein.

In making the bio-based coating (100) of the invention, oil polymerization creates a suspension that forms a hardened mixture when cooled below about 100 degrees Centigrade.

FIG. 2 illustrates a preferred method (200) of using the bio-based coating (100) on a building roof surface to permit transmission of infrared light when the temperature is below a switching temperature between about 18 and 35 degrees Centigrade and reflect infrared light when the temperature is above that switching temperature.

The method (200) of using comprises two steps. A first step (210) is spraying the suspension on the roof surface to form a membrane covering over the roof surface. The suspension will have to be at an elevated temperature up to about 160 degrees Centigrade to be a liquid capable of being sprayed. At about 160 degrees Centigrade, the bio based coating (100) is a low viscosity liquid that is easily sprayed using equipment well known in the art. The membrane thickness is preferably controlled to both optimize its performance while minimizing the volume of bio-based coating used.

A second step (220) is allowing the membrane covering to cool and harden. Cooling will occur by heat transfer to the environment. As the membrane covering cools below about 100 degrees Centigrade, it will harden to comprise a durable, waterproof sealant able to automatically and autonomously allow heating by transmission of sunlight, and aid in cooling by reflecting sunlight.

An alternative method of using the bio-based coating (100) involves use of a base coating of bioasphalt on a roof. Bioasphalt is an asphalt alternative made of bitumen from non-petroleum based renewable resources. An application of the base coating will make any rough surface on a roof smooth, which would help to achieve a uniform and even membrane to harden. Such a uniform and even layer is expected to be the best application of the bio-based coating.

FIG. 3 illustrates a preferred method (300) of making the bio-based coating (100). It comprises three steps. The first step (310) is heating the suspension to a reaction temperature between about 130 to 230 degrees Centigrade.

The second step (320) is holding at the reaction temperature for a period of time between about 10 to 120 minutes.

The third step (330) is introducing an air flow through the mixture at the reaction temperature at a rate of about 10 to 200 milliliters per minute per gram of oil.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the building and energy industries.

What is claimed is:

1. A bio-based coating comprising:
polymerized oil made from oil comprising triglycerides with unsaturated fatty acid chains, wherein the oil is free of petroleum; and,
a catalyst mixed with the oil before it is polymerized, the catalyst comprising a thermochromic material comprising one or more properties that:
reduces the temperature for polymerization of the oil to create a suspension that forms a hardened mixture when cooled below about 100 degrees Centigrade; and,
switches the hardened mixture from transparent to reflective of infrared light when the temperature rises above a switching temperature in an approximate range of 18 degrees Centigrade to 35 degrees Centigrade.

2. The bio-based coating of claim 1 wherein the oil is selected from the group consisting of: vegetable oil, liquid animal fat, algae oil, fish oil, palm oil, and, Jatropha Curcas oil.

3. The bio-based coating of claim 1 wherein the temperature for polymerization is reduced by the catalyst to a range of about 130-230 degrees Centigrade.

4. The bio-based coating of claim 1 wherein the thermochromic material consists of a vanadium oxide with tungsten dopant represented by the formula $V_xW_{1-x}O_2$, wherein the x is a decimal value between zero and 1.

5. The formula $V_xW_{1-x}O_2$ of claim 4, wherein the x consists of a value in the range of 0.97 to 0.99.

6. The bio-based coating of claim 4 wherein the thermochromic material is in a range of concentration in the suspension of about 0.05 to 5 weight percent.

7. The bio-based coating of claim 4 wherein the thermochromic material is in nanoparticle form.

8. A method of using the bio-based coating of claim 1 on a building roof surface to permit transmission of infrared light when the temperature is below a switching temperature between about 18 and 35 degrees Centigrade and reflect infrared light when the temperature is above that switching temperature, the method comprising the steps of:
spraying the suspension on the roof surface to form a membrane covering over the roof surface; and,
allowing the membrane covering to cool and harden.

9. A method of making the bio-based coating of claim 1 comprising the steps of:
heating the suspension to a reaction temperature between about 130 to 230 degrees Centigrade;
holding at the reaction temperature for a period of time between about 10 to 120 minutes; and,
introducing an air flow through the mixture at the reaction temperature at a rate of about 10 to 200 milliliters per minute per gram of oil.

* * * * *